(No Model.)
W. SCHILLING.
KNOB ATTACHMENT.
No. 490,685. Patented Jan. 31, 1893.
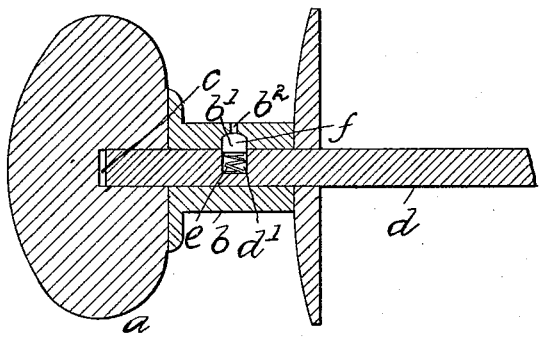
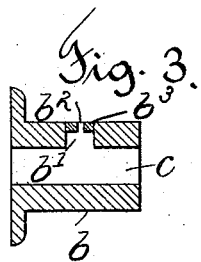
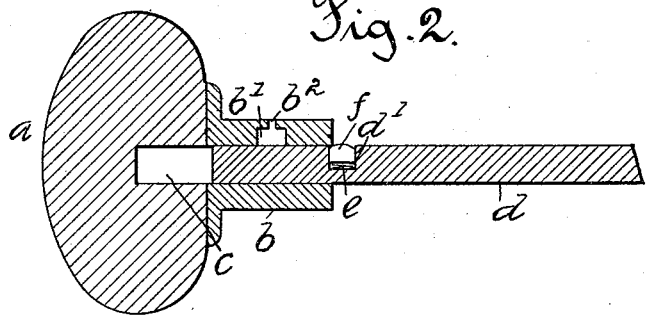
Witnesses
H. N. Gidding
G. B. Jenkins.
Inventor
William Schilling.
by Chas. L. Burdett
Attorney.

UNITED STATES PATENT OFFICE.

WILLIAM SCHILLING, OF HARTFORD, CONNECTICUT.

KNOB ATTACHMENT.

SPECIFICATION forming part of Letters Patent No. 490,685, dated January 31, 1893.

Application filed July 11, 1892. Serial No. 439,616. (No model.)

*To all whom it may concern:*

Be it known that I, WILLIAM SCHILLING, of Hartford, in the county of Hartford and State of Connecticut, have invented certain new and useful Improvements in Knob Attachments, of which the following is a full, clear, and exact description, whereby any one skilled in the art can make and use the same.

The object of my invention is to provide a device by means of which a door knob and its spindle may be securely fastened together. The fastening means are positive in operation and are concealed within the shank socket.

A further object is to provide a locking device in the use of which the parts may be easily and readily disengaged by means that are simple and usually conveniently at hand to be used by any person desirous of removing the knob from the spindle, the whole being cheap and simple of construction.

To this end my invention consists in the details of the several parts making up the device as a whole and in their combination as more particularly hereinafter described and pointed out in the claim.

Referring to the drawings: Figure 1 is a view in section of a knob and its spindle showing my improved fastening device in place. Fig. 2 is a like view showing the spindle partly removed from and the fastening device just at the point of entering the socket. Fig. 3 is a view in section of the shank showing one form of construction of the locking recess therein.

In the accompanying drawings the letter $a$ denotes the knob proper that is made of composition of matter or any like suitable material to which is secured by means of any common and well known method the shank $b$. Within this shank is provided a socket $c$ that may be of any desired shape, that is, square, round or of any other shape, and within this socket is adapted to fit the spindle $d$. Within the shank $b$ is provided a locking recess $b'$, of any desired shape, preferably round and extending from this recess to the outer side of the shank is a smaller opening $b^2$. Within the shank $d$ is provided a socket $d'$ of any desired shape, preferably round, and located in the lower side of this recess is a spring $e$. There is also located within this recess $d'$ and seated upon the spring $e$, that may be of any desired and well known construction, a locking pin $f$ preferably conforming to the shape of the socket within which it is located. The socket within the spindle is made preferably round on account of the cheapness of construction, it being necessary to simply drill a hole of the desired shape in the spindle but preferably not extending quite through the same. The locking recess $b'$ within the shank may be formed in casting the same to shape and the small opening $b^2$ then drilled through from the outside or this socket may be formed by drilling a hole partly through the shank into the socket $c$ of the size of the locking recess and then inserting a plug $b^3$ having provided therein the small opening $b^2$ within the mouth of the locking recess $b'$ as shown in Fig. 3 of the drawings.

The method of securing the spindle within the socket in the shank is as follows; The spring $e$ is placed in the locking recess $b'$ and the locking pin $f$ then seated on the spring and projecting a slight distance beyond the surface of the spindle $d$. The end of the spindle is then inserted within the socket $c$ in the shank and the locking pin $f$ pressed down until its outer end is nearly in line with the surface of the spindle; this will enable the spindle to be thrust into the socket in the shank until the recesses $d'$ and $b'$ are in line with each other when the locking pin $f$ under the impulse of the spring is forced into the locking recess $b'$ thus securing a spindle within the socket in the shank. When it is desired to remove the knob and shank from the spindle it may be done by inserting a pin or like instrument within the small opening $b^2$ and pressing the locking pin $f$ down the required distance to allow the knob and shank to be pulled off from the spindle.

I do not mean to be understood as claiming broadly a method of securing a spindle within a knob shank by means of a pin in one part entering a socket in the other under the impulse of a spring, my invention being limited to a spring seated locking pin located within the spindle and entering a concealed socket located within the shank, and means of fastening being positive and entirely concealed from view.

My invention is of value for the reason that any ordinary construction of spindle may be quickly and cheaply fitted with my improved fastening device and the spindle may be provided with one or more holes bored therein to form sockets for the pin.

I claim as my invention:

In combination with a knob and its appurtenant shank, a spindle socket located within the shank, and the concealed spindle locking means consisting of a recess located within the wall of the socket in the shank and with a smaller opening extending from this recess to the outside of the shank, a spindle fitting the socket in the shank and provided on one side with a recess adapted to register with the recess in the wall of the shank, and a spring seated pin located in the recess in the side of the spindle, all substantially as described.

WILLIAM SCHILLING.

Witnesses:
 CHAS. L. BURDETT,
 A. B. JENKINS.